United States Patent [19]

Smith

[11] 4,236,351
[45] Dec. 2, 1980

[54] PLANTER WITH TUBULAR AIR HOLE MEMBER

[76] Inventor: Elmer L. Smith, 6090 Cedarwood Rd., Mentor-on-the-Lake, Ohio 44060

[21] Appl. No.: 964,927

[22] Filed: Nov. 30, 1978

Related U.S. Application Data

[63] Continuation-in-part of Ser. No. 801,530, May 31, 1977, Pat. No. 4,173,098.

[51] Int. Cl.³ .............................................. A01G 25/00
[52] U.S. Cl. ....................................................... 47/79
[58] Field of Search .................... 47/79, 80, 81, 66, 39, 47/19

[56] References Cited

U.S. PATENT DOCUMENTS

| | | | |
|---|---|---|---|
| 2,281,068 | 4/1942 | Farnham | 47/79 X |
| 2,859,557 | 11/1958 | Lattuca | 47/66 |
| 3,334,440 | 8/1967 | Choquette | 47/79 |
| 4,077,159 | 3/1978 | Haglund | 47/79 |

FOREIGN PATENT DOCUMENTS

| | | | |
|---|---|---|---|
| 80172 | 7/1894 | Fed. Rep. of Germany | 47/79 |
| 1207695 | 12/1965 | Fed. Rep. of Germany | 47/79 |
| 367247 | 10/1906 | France | 47/79 |
| 86096 | 10/1965 | France | 47/79 |
| 6711673 | 2/1968 | Netherlands | 47/79 |
| 403460 | 12/1933 | United Kingdom | 47/79 |

*Primary Examiner*—E. H. Eickholt
*Attorney, Agent, or Firm*—J. Helen Slough

[57] ABSTRACT

A receptacle having an imperforate bottom has a perforated, horizontal wall spaced upwardly from the bottom and dividing the receptacle into upper and lower compartments. Tubes project through the perforated wall and extend upwardly above the upper edge of the receptacle and downwardly to the bottom of said receptacle. Lower end portions of the tubes below the horizontal wall are also perforated. The upper compartment is adapted to receive soil and the lower compartment receives excess water which evaporates through the tubes and keeps the soil moist.

4 Claims, 11 Drawing Figures

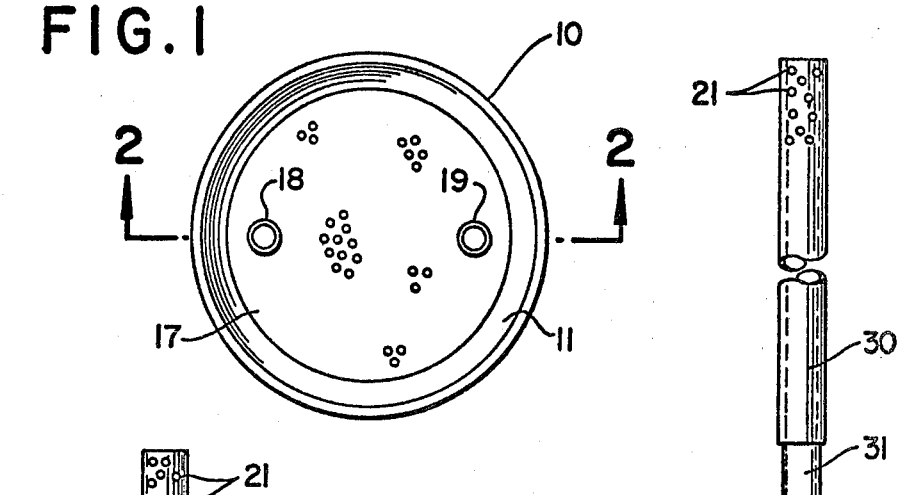
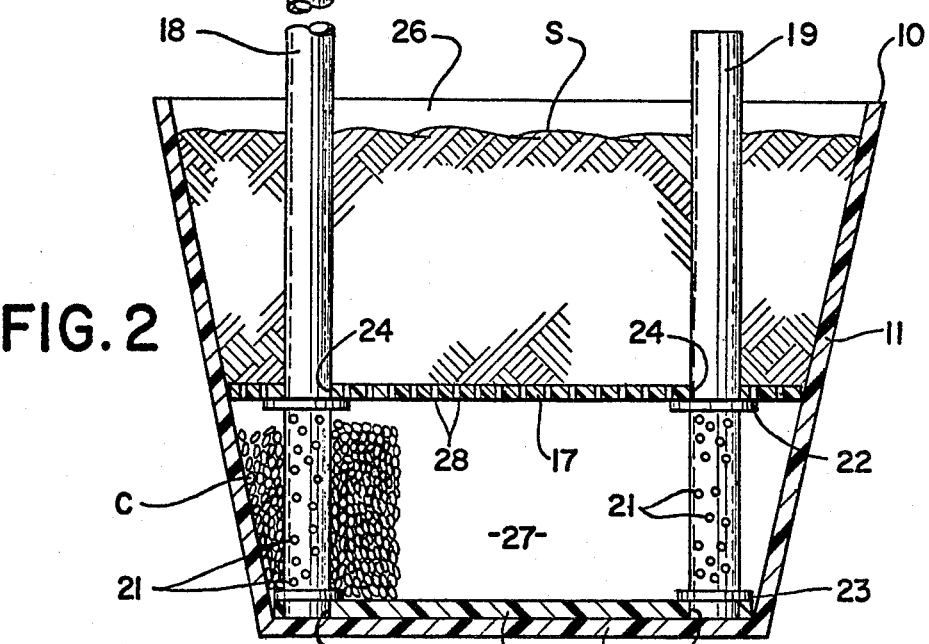
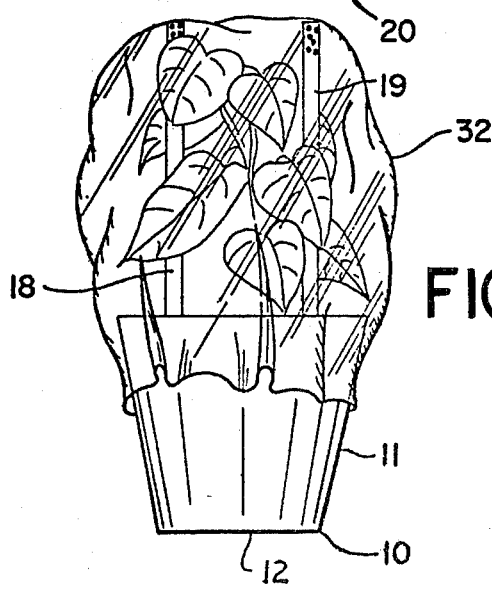
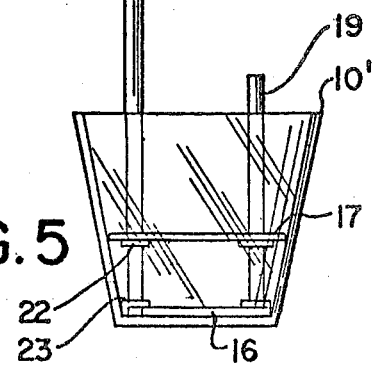

PLANTER WITH TUBULAR AIR HOLE MEMBER

CROSS-REFERENCE TO RELATED APPLICATIONS

This is a continuation-in-part of application Ser. No. 801,530, filed on May 31, 1977, now U.S. Pat. No. 4,173,098.

This invention refers to planters and particularly to a planter having a drainage compartment or space disposed beneath the soil and which may further include means for supporting a plant and/or a transparent cover for the plant. Planters of this type are known wherein a bottom compartment is provided for receiving excess water and disposing of the same or wherein the compartment is used to contain water or liquid fertilizer, the liquid creating a damp atmosphere beneath the soil and tending to keep it moist. It is also known to provide upwardly projecting support means mounted inside a planter. Prior planter or flower pot constructions having one or more of the above features are shown in various U.S. patents; namely U.S. Pat. No. 132,178 issued to Pugh Oct. 15, 1872; U.S. Pat. No. 165,000 issued to J. S. Johnson June 29, 1875; U.S. Pat. No. 1,570,841 issued to W. Karnatz Jan. 26, 1926; U.S. Pat. No. 2,331,397 issued to H. H. Hummel Oct. 12, 1943; U.S. Pat. No. 2,404,370 issued to W. Fowlkes July 23, 1946; and U.S. Pat. No. 3,165,863 issued to J. Duran Jan. 19, 1965. Certain foreign patents also show similar construction; namely French Pat. No. 86,096 dated Oct. 25, 1965; and Dutch Pat. No. 6711673 dated Feb. 28, 1968.

The present invention as herein disclosed comprises an upwardly open receptacle having a removable soil supporting insert structure including a horizontally disposed, perforated wall adapted to be disposed a substantial distance above the bottom of the receptacle and tube means projecting through the perforated wall and extending upwardly and downwardly therefrom. The horizontal wall divides the receptacle into upper and lower compartments, and the portion of the tube means disposed within the lower compartment is perforated whereby ambient air can circulate into the lower compartment. The upper compartment is adapted to contain soil, and the lower compartment is adapted to receive excess water from the upper compartment. The perforated tubes afford means for evaporation of the excess water and the circulation of ambient air beneath the soil for the purpose of aeration. An additional feature herein disclosed comprises extending the tube means upwardly a substantial distance above the receptacle to serve as a plant support or a support for a transparent plant cover. Perforations are provided in the upper end portion of the tube means whereby a moist atmosphere caused by evaporation in the lower compartment is provided within the transparent cover.

The present invention also contemplates providing a planter insert structure which is adapted to be assembled and inserted into a suitable receptacle, and which can be removed and dismantled if desired.

The general object of this invention is to provide an improved planter creating ideal growing conditions for potted plants.

Another object of this invention is to provide a planter of the type referred to which eliminates the need for draining off excess water applied to the soil.

Still another object of the invention is to provide a planter of the above type wherein means are provided for both aerating and moisturizing the plant soil from below.

A still further object of this invention is to provide a planter which can remain unattended for long periods of time without damage to the plant.

Yet another object of the invention is to provide a planter having the above features and characteristics wherein a portion of the aerating means can also serve as a plant support.

Yet another object of this invention is to provide a planter of the type referred to comprising easily assembled parts which simplify packing, shipping, and merchandising of the planter or dismantling and cleaning thereof.

A further object of the invention is to provide an easily assembled and dismantled planter insert structure for a plant receptacle.

Another object of this invention is to provide a planter as characterized above adapted to receive a transparent cover to create a greenhouse effect and having means for maintaining a moist atmosphere within the cover.

Yet another object of this invention is to provide such a planter whereby the user can visually determine the amount of water in the lower compartment.

Other objects of the invention and the invention itself will become readily apparent from the following specification and reference to the accompanying drawings, in which said drawings:

FIG. 1 is a top plan view of the planter of this invention;

FIG. 2 is an enlarged section taken along the line 2—2 of FIG. 1 showing the planter with soil disposed therein;

FIG. 3 is a detail view of a tubular extension for the planter;

FIG. 4 is a side elevation on a reduced scale of the planter showing the same supporting a transparent cover;

FIG. 5 is a side elevation of a modified planter drawn to the scale of FIG. 4;

Figure 6:
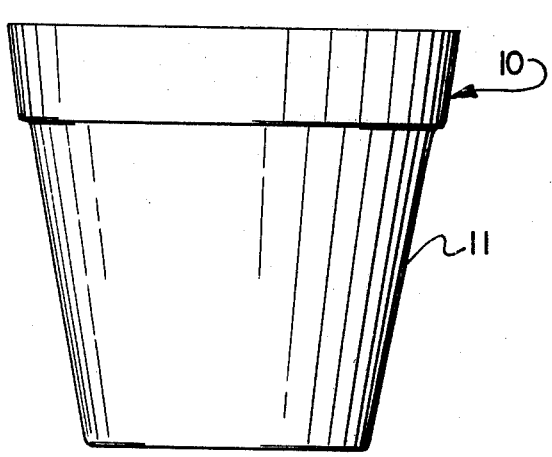
FIG. 6 is a side elevation of a planter receptacle suitable for receiving the planter insert of the present invention.

Referring now to the drawings in all of which like parts are designated by like reference numerals, the planter of this invention comprises an upwardly opened receptacle 10 which may be of any suitable shape and is herein disclosed as being of inverted frustoconical form. Said receptacle comprises a circumferentially continuous, upwardly diverging side wall 11 and an imperforate bottom wall 12.

The receptacle 10 is adapted to receive an insert structure, generally indicated at 13, which comprises a bottom support disc 16, an upwardly spaced horizontal wall 17, and a plurality of tubular members 18 and 19. Although the invention illustrated in the embodiment of FIGS. 1, 2, 4, and 5 discloses two such tubular members, it will be understood that any suitable number may be used depending upon the size and capacity of the planter and the kind of plant to be grown. All of the planter parts are ideally constructed of a suitable plastic which is waterproof and characterized by substantial rigidity.

The bottom support disc 16 is disposed flatwise against the imperforate bottom wall 12 and is provided with a pair of apertures 20 disposed adjacent to the periphery of the disc, said apertures being of such size as to slideably receive the lower ends of the tubular members 18 and 19. Said tubular members project upwardly through suitable apertures 24 in the horizontal wall 17, said apertures 24 slideably receiving said tubular members.

In the form of the invention shown in FIG. 2, the tubular member 18, part of which is shown broken away, preferably projects a substantial distance above the upper edge of the receptacle 10. The lower end portion of the tubular member 18 is provided with a plurality of small perforations 21 in the area thereof disposed between the horizontal wall 17 and the imperforate bottom wall 12. An upper end portion of said tubular member 18 is also provided with a plurality of perforations 21, the intermediate portion of said member comprising an imperforate cylindrical wall. The lower end portion of the tubular member 18 is also provided with upper and lower support rings 22 and 23, respectively, which are integral with or securely fastened to said tubular member. The support rings 22 and 23 are disposed against the bottom of the wall 17 and the top of the support disc 16, respectively, whereby to space said wall 17 a predetermined distance above the bottom wall 12 of the receptacle and to stabilize the insert structure 13.

The tubular member 19 is similar in construction to the tubular member 18 and is similarly provided with perforations 21 and support rings 22 and 23 adjacent to the bottom end thereof below the wall 17. In the form of the invention herein illustrated, the upper end of the tubular member 19 terminates only a short distance above the upper edge of the receptacle 10.

The wall 17 divides the receptacle 10 into an upper compartment 26 and a lower 27. Said wall 17 is provided with a multiplicity of small perforations 28 whereby water and air can circulate between said upper and lower compartments.

The perforated wall 17 is adapted to closely but not tightly interfit the frustoconical side wall 11 at the level at which it is disposed. The perforations 28, although large enough to freely allow the circulation of air and water, are small enough to prevent any substantial amount of soil from passing therethrough. Thus the upper compartment 26 is adapted to receive planting soil S which surrounds nonperforated portions of the tubular members 18 and 19 and which does not extend above the upper end of either of said members. When the plant is watered, excess water drains through the perforations 28 and accumulates in the lower compartment 27. The water can freely enter the tubular members 18 and 19 in a radial direction through the perforations 21 in the lower end portions thereof. Said tubular members are open at the top to allow evaporation of the water in the lower compartment 27. Under usual conditions, said lower compartment will have some water disposed therein but will also afford an air space having a humid atmosphere which will serve to keep the soil adjacent to the roots of the plant moist and ideal for growing conditions. At the same time, ambient air may freely circulate through the tubular spacer members 18 and 19 beneath the soil whereby said soil is aerated.

Water in the lower compartment 27 tends to keep the soil above it moist for a longer period of time than ordinary watering with conventional flower pots. Thus if the owner is going to be away for an extended period and cannot water the plant, the lower compartment 27 can be filled and the plant will have adequate moisture even when left unattended. It will be readily understood that the length of time which a plant could go without rewatering would depend upon variable factors such as the size of the planter in relation to the size of the plant, the size of the bottom compartment 27, and the type of plant used, as will be readily understood by any horticulturist.

The basic planter of this invention as hereinabove described is subject to certain modifications and adaptations. For example, charcoal granules C can be placed in the lower compartment 27 to absorb any unpleasant soil odor that might escape through the tubular members 18 and 19. The longer tubular member 18, in addition to comprising part of the evaporation system, can also provide means for supporting a large plant which can be tied or otherwise attached thereto.

In some instances, it may be desirable to have two elongated tubes for the purpose of more adequately supporting a plastic cover over a growing plant. FIG. 3 illustrates an extension 30 the lower end of which has a circumferentially reduced shank 31 adapted to be inserted in the upper end of the tubular member 19. Thus the tubular member 19 can be extended to the height of the tubular member 18 whereby said tubular members can be used to support a transparent cover 32. The cover 32 is preferably made of flexible plastic which can be drawn around the upper end of the receptacle 10 or tucked inwardly under the plant thereby creating an individual greenhouse effect for the plant. The upper end of the extension 30, like the upper end of the tubular member 18, is also provided with perforations 21. Thus, the damp air from the lower compartment 27 can circulate into the "greenhouse" thereby providing a moist atmosphere caused by the evaporation of the water through the hollow tubes.

It will be readily seen that the present invention makes it possible for the horticulturist to provide sustained and prolonged watering of the plant and also allows him to create exactly the ideal atmosphere and growing conditions for any given flower or the like. If the greenhouse effect is provided, the user may leave an opening in the plastic cover for misting or watering. Trays or reservoirs beneath the receptacle are completely unnecessary, and the lower compartment 27 does not need to be emptied. FIG. 5 illustrates a planter of the present invention wherein the receptacle 10 is transparent glass or plastic thereby allowing the user to see exactly how much water is collecting in the lower compartment 27.

Figure 8:
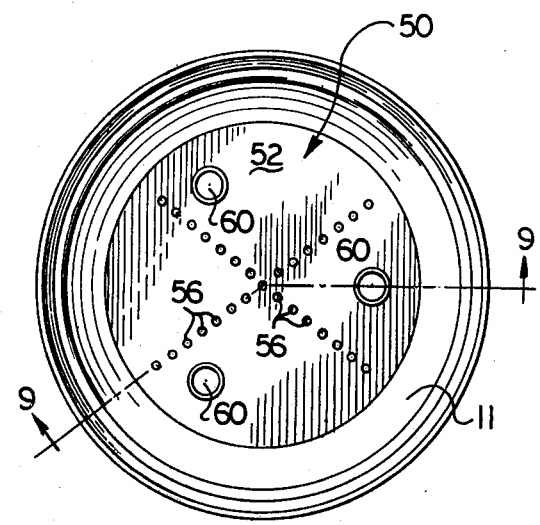
FIG. 8 is a top plan view of an alternate embodiment of a planter in accordance with the present invention.
Figure 7:
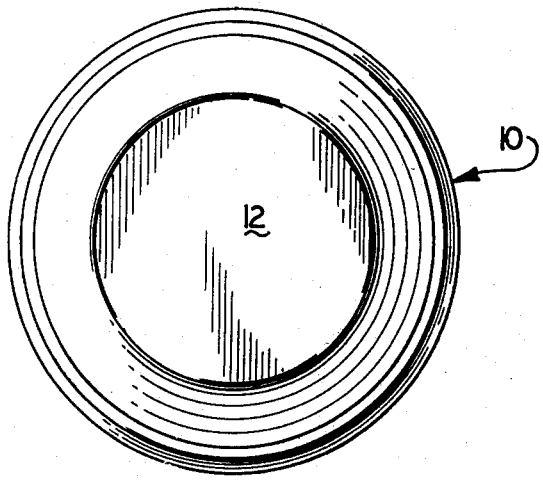
FIG. 7 is a bottom plan view of the receptacle of FIG. 6.
Figure 9:
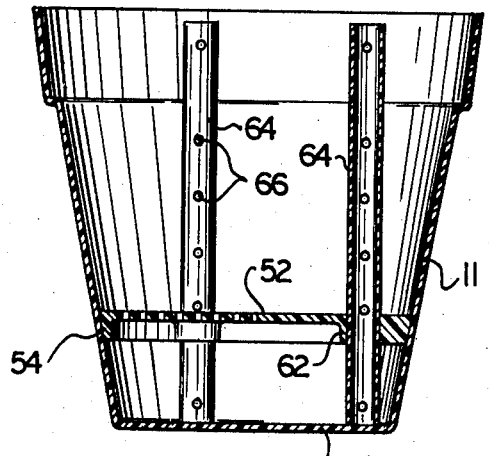
FIG. 9 is a sectional view taken substantially along the line 9—9 of FIG. 8.
Figure 10:
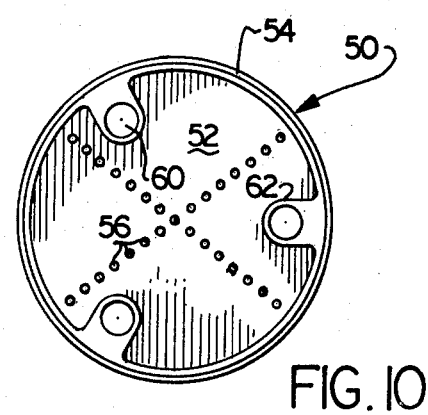
FIG. 10 is a bottom plan view of a horizontal dividing wall insert of an alternate embodiment of the present invention.

FIGS. 8–10 illustrate an alternate embodiment of the present invention, wherein the perforate horizontal wall structure is supported by the side walls 11 of the receptacle 10 thereby eliminating the need for the support rings and the support disc. As in the case of the former embodiment, the side wall 11 of the receptacle 10 has a slightly downward taper. An insert, designated generally as 50, is adapted to mate with the side walls at a predetermined distance from the imperforate bottom wall 12 which is determined by the diameter of the insert 50.

The insert 50, preferably manufactured from a molded plastic material, is comprised of a central, substantially circular web 52 having a downwardly projecting peripheral annular flange 54. Preferably, the face of the flange 54 which mates with the interior of the side wall 11 has a slight taper to match that of the side wall, as best viewed in FIG. 9. This flange 54 serves to stabilize the insert 50 within the receptacle 10 while also providing strength and rigidity to the central web 52.

A pattern of perforations 56 are formed in the central web 52 to serve the same function of moisture communications as the apertures or perforations 28 in the wall 17 of the embodiment illustrated in, e.g., FIG. 2. Accordingly, the pattern of apertures or perforations 56, their size and relative spacing may be altered without departing from the spirit of the present invention. Also, formed in the central web 52 are a plurality of tube-receiving apertures or bores 60, two such apertures being illustrated in the embodiment of FIGS. 8–10.

Surrounding each of the tube-receiving apertures 60 is an integrally molded sleeve 62, best viewed in FIGS. 9 and 10, depending downwardly from the central web 52. Along, with the flange 54, these sleeves serve to strengthen the web of the insert 50 and aid in the stabilization of the tubes received through the apertures 60 thereof.

Perforated tubes 64, similar in design to the tubes 19 of the embodiment of FIGS. 1–5, are adapted for insertion through the apertures 60 and integral sleeves 62. The inner diameter of the aperture and cooperating sleeve is designed for a close interference with the tube 64, to aid in retaining and positioning the latter.

Each of the tubes 64 is provided with a pattern of perforations 66 which are substantially symmetric in order that the tube 64 can be inserted through the insert 50 in either direction and yet be effective for its intended use. Accordingly, the perforations 66 at the terminal ends of the tube 64 are located equi-distantly from these ends; whereas the intermediate perforations are formed such that the lowermost perforation will be disposed slightly above the central web 52, as shown in FIG. 9, regardless of which end of the tube 64 is inserted into the aperture 60. The interference fit between the tube 64 and cooperating aperture 60 will permit any slight desirable vertical adjustment of the tube 64.

Figure 11:
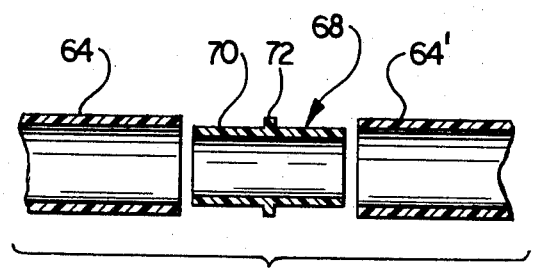
FIG. 11 is an enlarged, fragmentary view showing an extension member for the perforated tubes of the present invention.

FIG. 11 illustrates an alternate embodiment for extending the perforated tube in the manner shown, for example, in FIG. 5. As opposed to the reduced shank 31, an insert designated generally as 68 is formed for insertion within a first perforated tube 64 in order for a second perforated tube 64' to be joined therewith. The insert 68 is a substantially cylindrical tube 70 having an outer diameter generally equal to the inner diameter of the tubes 64 and 64'. A circumferential shoulder 72 is located approximately midway between the ends of the tube 70 for engagement with the ends of the opposing perforated tubes 64 and 64'. Accordingly, the insert may be disposed within the first tube 64 up to the point of the shoulder 72 and the second tube 64' disposed in the insert also up to the shoulder 72. In this manner, the two tubes 64 and 64' may be identical, as opposed to the configuration of FIG. 5 requiring tubes of different geometries.

It will be understood that many changes in the detail of the invention as herein described and illustrated may be made without, however, departing from the spirit thereof or the scope of the appended claims.

I claim:

1. A removable planter insert structure for a receptacle open at the top and having an imperforate bottom, said insert structure comprising a horizontal perforated wall member adapted to be disposed within a receptacle and spaced above the bottom thereof to divide the receptacle into upper and lower compartments;

said wall member having aperture means therein;

tubular means having a cross section such as to slideably interfit said aperture means and to project upwardly through said aperture and above said horizontal wall;

said tubular means having spacer means for limiting the extent to which said tubular means can project through said aperture means and for supporting said wall member a determined distance above the bottom of a receptacle;

said tubular means being perforated below said spacer means to allow air and water to pass radially therethrough;

said upper compartment adapted to hold soil to a level below the upper ends of said tubular means whereby when excess water from said soil passes through said perforated horizontal wall and collects in said lower compartment, said tubular members provide means for air circulation and evaporation within said lower compartment and said perforated wall portion provides means for humid air to aerate said soil and keep it moist.

2. A planter comprising a receptacle open at the top and having an imperforate bottom and side walls a unitary removable insert structure for said receptacle, said structure comprising a central perforated web, a downwardly disposed peripheral annular flange on said web for engaging the side wall of said receptacle to space said structure above said bottom wall to provide upper and lower compartments, and a plurality of reinforced apertures in said web for receiving a corresponding number of perforated tubular members, each of said tubular members projecting upwardly through one of said reinforced apertures and above said perforated web, and downwardly into proximate engagement with said bottom wall, and having at least one aperture in that portion of the tubular member positioned in the lower compartment to provide air circulation and water vapor communication between water in said lower compartment and soil in said upper compartment, said reinforced apertures in the web having an integral downwardly depending sleeve having an inner diameter corresponding with that of said aperture.

3. A planter as set forth in claim 2, wherein the inner said diameter of the sleeve is about the same as the outer diameter of a received perforated tubular member.

4. A planter as set forth in claim 2, further comprising an extended perforated tubular member disposed in each of said reinforced apertures, each of said extended tubular members comprising a lower tubular member received within said aperture and an upper tubular member joined thereto by an internally received extension member comprised of a tube having an outer diameter substantially the same as the inner diameter of each of the upper and lower tubular members and an outwardly directed circumferential flange.

* * * * *